US010002038B2

(12) United States Patent
Olson et al.

(10) Patent No.: US 10,002,038 B2
(45) Date of Patent: Jun. 19, 2018

(54) NETWORK RE-TIMER WITH FORWARD ERROR CORRECTION HANDLING

(71) Applicant: Hewlett Packard Enterprise Development LP, Houston, TX (US)

(72) Inventors: David M. Olson, Houston, TX (US); John Wastlick, Allen, TX (US); Erin Hallinan, Ft. Collins, TX (US); Jason Jung, Garland, TX (US); Kevin B. Leigh, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 71 days.

(21) Appl. No.: 15/143,445

(22) Filed: Apr. 29, 2016

(65) Prior Publication Data

US 2017/0317785 A1    Nov. 2, 2017

(51) Int. Cl.
*G06F 11/00* (2006.01)
*G06F 11/07* (2006.01)
*H04L 1/00* (2006.01)

(52) U.S. Cl.
CPC ........ *G06F 11/0709* (2013.01); *H04L 1/0041* (2013.01); *H04L 1/0045* (2013.01)

(58) Field of Classification Search
CPC .. G06F 11/0709; G06F 11/10; G06F 11/1052; G06F 11/08; G06F 11/3006; H04L 1/0041; H04L 1/0045
See application file for complete search history.

(56) References Cited

U.S. PATENT DOCUMENTS

| 6,148,002 A | 11/2000 | Patel et al. | |
| 6,507,591 B1 * | 1/2003 | Bray | H04J 3/0688 370/465 |
| 6,697,385 B1 * | 2/2004 | Matthews | H04J 3/0632 370/419 |

(Continued)

FOREIGN PATENT DOCUMENTS

WO    2013169229    11/2013

OTHER PUBLICATIONS

Christensen, D, "Simplifying Network Connectivity with Remotephy Technology in Dell Blade Servers," May 2008, http://www.dell.com/Downloads/Global/Power/ps2q08-20080209-Broadcom.pdf, 3 pages.

(Continued)

*Primary Examiner* — Joseph D Manoskey
(74) *Attorney, Agent, or Firm* — Hanley Flight & Zimmerman, LLC

(57) ABSTRACT

A network re-timer with forward error correction handling is disclosed. An example network re-timer includes a first receiver to receive data from a first connected device and to re-time the data to generate re-timed data, a first transmitter to transmit the re-timed data to a second connected device, a first auto-negotiation handler communicatively coupled to the first receiver to control a first forward error correction mode for communications with the first connected device, and a second auto-negotiation handler communicatively coupled to the first transmitter to control a second forward error correction mode for communications with the second connected device, wherein the first forward error correction mode is different than the second forward error correction mode.

15 Claims, 11 Drawing Sheets

(56) References Cited

U.S. PATENT DOCUMENTS

| | | |
|---|---|---|
| 7,558,281 B2 | 7/2009 | Dropps et al. |
| 8,130,786 B2 | 3/2012 | Furlong et al. |
| 8,296,630 B2 | 10/2012 | Garcia et al. |
| 8,576,745 B2 | 11/2013 | Diab et al. |
| 8,601,297 B1 | 12/2013 | Abts et al. |
| 8,984,380 B2 | 3/2015 | Vijayaraghavan et al. |
| 8,995,457 B1 | 3/2015 | Dropps et al. |
| 9,105,377 B2 | 8/2015 | Diab |
| 2009/0269081 A1* | 10/2009 | Cai ................. H04L 1/0045 398/202 |
| 2011/0239084 A1* | 9/2011 | Abbasfar ............ G06F 11/1004 714/758 |
| 2014/0258813 A1 | 9/2014 | Lusted et al. |
| 2015/0229527 A1 | 8/2015 | Robitaille et al. |
| 2015/0229588 A1* | 8/2015 | Pillai ................. H04L 49/3054 370/437 |

OTHER PUBLICATIONS

Altera Corporation, "Dynamic Reconfiguration of Transceiver Channels Using Multiple PLLs in Stratix IV Devices," https://www.altera.com/content/dam/altera-www/global/en_US/pdfs/literature/an/an607.pdf, Aug. 2010, 14 pages.

Texas Instruments, "DS250DF410 25 GBPS Multi-Rate 4-Channel Retimer," Feb. 2016, http://www.ti.com/lit/ds/symlink/ds250df410.pdf , 12 pages.

Broadcom Corporation, "8-Channel Multirate 1.0-3.2-GBPS Retimer/Switch," Apr. 15, 2004, http://pdf.datasheetcatalog.com/datasheet2/5/0wo6j2jat3o35hdr57wf67qjjdcy.pdf, 3 pages.

* cited by examiner

NETWORK RE-TIMER WITH FORWARD ERROR CORRECTION HANDLING

BACKGROUND

Computing devices are often connected by network connections. For example, computing devices are frequently connected by Ethernet network connections. Such computing devices support a variety of capabilities (e.g., connection data rates, communication protocols, error correction protocols, etc. For example, some computing devices support forward error correction (FEC). When utilizing FEC, a sender of data encodes the message in a redundant manner using error correcting codes (ECC) to increase the chances that a receiver can decode the data without requesting a retransmission.

Some computing devices include a network device motherboard (e.g., a built-in network device motherboard or an adapter network device motherboard) that interfaces with a separate transceiver. For example, the network device motherboard may include and/or be communicatively coupled with a port that can receive a transceiver (e.g., different transceivers may provide different PHY types). The interface to the transceiver may be, for example, enhanced small form-factor pluggable (SFP+), quad small form-factor pluggable (QSFP), or any other type of interface for communicatively coupling a transceiver with a device (e.g., a network device in a computing device such as a server, a switch, etc.). Alternatively, a transceiver may be integrated with the network device motherboard that is integrated into a computing device and/or on an adapter installed in the computing device.

In some networking environments, network cabling between two networked devices may not provide sufficient communication fidelity. For example, communications transmitted over long distances may not be received properly when reaching their destination. In such instances, a re-timer (e.g., an Ethernet re-timer) may be connected intermediate between the two networked devices. The Ethernet re-timer includes the capability to perform Ethernet link training, recover a clock, and re-drive data to extend electrical drive capabilities beyond what a typical single driver can accomplish. The re-timer resides at an intermediate point between the two network devices, effectively breaking one long distance communication into two electrically shorter connections.

DETAILED DESCRIPTION

Figure 1:
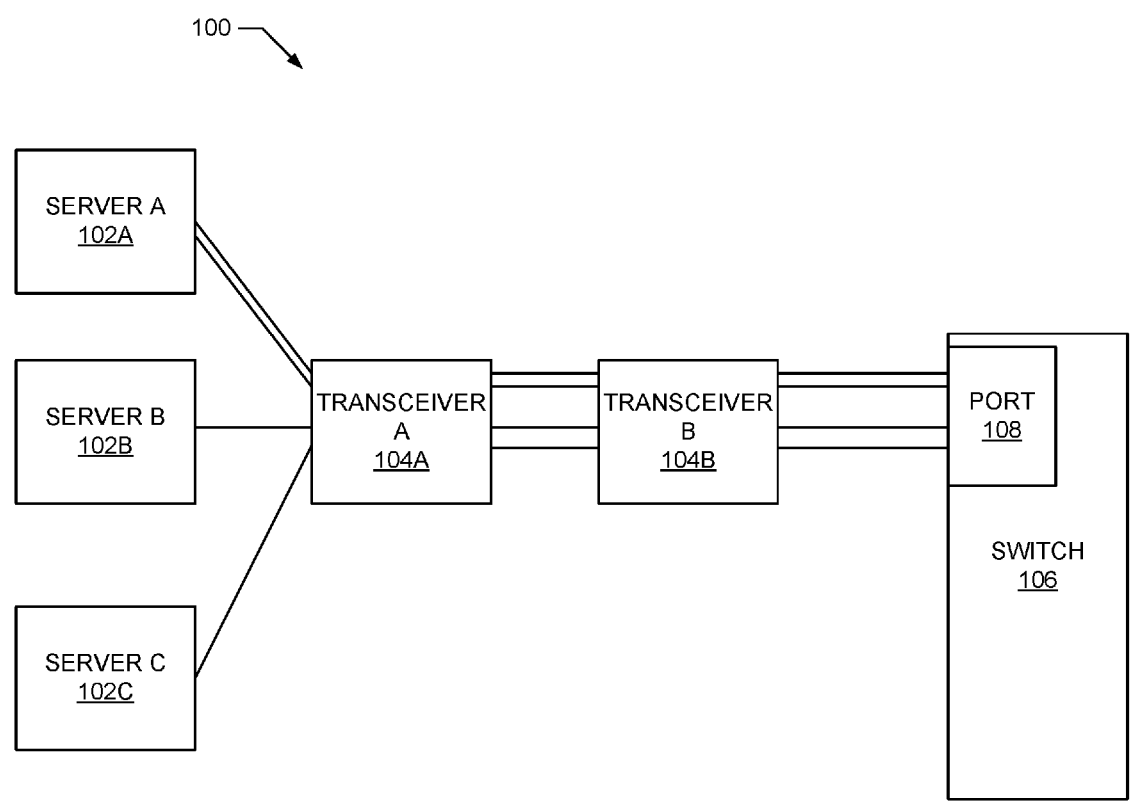
FIG. 1 is a block diagram illustrating an environment in which a pair of example transceivers are utilized to communicatively couple example first network device(s) and example second network device(s).

In some computing devices (e.g., network switches that utilized high-radix switch chips) a shared phased lock loop (PLL) is utilized for multiple lanes (e.g., four lanes) to minimize design complexity, power consumption, and cost. In such designs, all lanes that share a PLL must operate at a same clock-rate. Accordingly, when a first device that supports a maximum rate of 10 gigabit per second (Gbps) Ethernet is connected to a first lane of a network switch and a second device that supports a maximum rate of 25 Gbps Ethernet is connected to a second lane (where the first lane and the second lane are connected to a multilane port that shares a PLL), the multilane port is operated at 10 Gbps (e.g., the lowest common denominator (LCD) capability among all connected devices) for both devices (e.g., because the first device cannot support 25 Gbps and the second device is backwards compatible to 10 Gbps). Such a result is undesirable as some devices will not operate at the maximum possible rate or capability (e.g., when the network switch supports 25 Gbps).

Some example apparatus, methods, and articles of manufacture disclosed herein facilitate the use of a pair of transceivers that are communicatively coupled to allow the devices connected to a single multi-lane port that utilizes a shared PLL to operate at a highest common denominator capability (HCD) for each lane (e.g., the HCD capability for each lane is the highest capability supported by the device connected to the lane and the device (e.g., network switch) that includes the port)). In some examples, the transceivers facilitate auto-negotiation communications (e.g., communications utilized to exchange capabilities and to select common capabilities for a communications session) among the transceivers and connected devices to cause each device to operate at a HCD capability.

Any of the transceivers disclosed herein may be electrical/optical transceivers, electrical transceivers, optical transceivers, etc. Furthermore, any of the transceivers disclosed herein may be implemented as integrated transceivers (e.g., integrated in a network device and/or network interface), pluggable transceivers (e.g., transceivers configured to be installed in an SFP port, an SFP+ port, a QSFP port, etc.), or any other type of transceiver. Any of the ports and/or interfaces described herein may implemented by and/or include pluggable ports, embedded connections (e.g., embedded optical connections) etc.

In typical network systems that include a re-timer (e.g., an Ethernet re-timer), the re-timer does not support auto-negotiation (e.g., does not support 10GBASE-KR). Some re-timers (e.g., re-timers that support, for example, 10GBASE-KR) receive auto-negotiation messages from a first network device, perform re-timing, and pass the auto-negotiation messages to a second network device without processing and/or responding to the auto-negotiation messages. In such systems, the first network device and the second network device negotiate to select common capabilities (e.g., the connections on either side of the re-timer are negotiated to a common mode). For example, if the first network device supports forward error correction (FEC), but the second network device does not support FEC, the auto-negotiation messages will result in the communication session being established without FEC support (e.g., because the capabilities of the two devices do not match).

Some example apparatus, methods, and articles of manufacture disclosed herein provide a re-timer that participates in auto-negotiation communications to allow the use of independent capabilities between two network devices interconnected by the re-timer. For example, when the first network device supports FEC and the second network device does not support FEC, the disclosed example re-timer negotiates with the first network device to utilize FEC in communications between the first network device and the re-timer and negotiates with the second network device to not use FEC in communications between the second network device and the re-timer. Accordingly, each of the links to the re-timer may utilize different capabilities (e.g., FEC, or any other type of capability) when the disclosed auto-negotiation process is utilized.

While particular transmit and receive data rates (e.g., 10 Gbps and 25 Gbps) are identified in examples disclosed herein, any other data rates may be utilized in implementations of the example methods, apparatus, and systems disclosed herein.

FIG. 1 is a block diagram illustrating an environment 100 in which a pair of example rate adapting transceivers 104A, 104B (referred to as transceivers herein) are utilized to communicatively couple example first network device(s) (example server A 102A, example server B 102B, and example server C 102C) and example second network device(s) (switch 106).

The example servers 102A-102C are computing devices that include network elements that may be communicatively coupled with a transceiver. According to the illustrated example, the example servers 102A-102C are installed in a frame (e.g., a blade server chassis, a server rack, etc.) that includes a port(s) for receiving a transceiver element (e.g., a QSFP port) such as the example transceiver A 104A. According to the illustrated example, the three example servers 102A-102C utilize four communication lanes (e.g., two lanes associated with example server A 102A, one lane associated with example server B 102B, and one lane associated with example server C 102C). Alternatively, any number of lanes may be utilized by any number and/or type of computing devices (e.g., servers, user computers, network switches, etc.).

According to the illustrated example, the transceivers 104A and 104B are implemented in accordance with the apparatus, methods, and articles of manufacture disclosed herein to facilitate communication between the example servers 102A-102C and an example port 108 of the example switch 106. In particular, the example transceivers 104A and 104B operate to enable each lane between the example servers 102A-102C and the example port 108 to operate at a HCD capability (e.g., to allow some lanes to operate at a higher capability than is supported by some of the network elements of the example servers 102A-102C).

The example transceiver A 104A and the example transceiver B 104B are pluggable transceivers that may be installed in a port in the example servers 102A-102C and/or the example port 108 of the example switch 106. Alternatively, the example transceiver A 104A may be communicatively coupled to the example servers 102A-102C and the example transceiver B 104B may be communicatively coupled with the example port 108 in any manner (e.g., via an electrical cable and/or connection, via an optical cable and/or connection, integrated in the example servers 102A-102C and/or the example port 108 (e.g., as embedded optical module(s), transmitters, sensors, or other components), etc.).

The example transceiver A 104A is communicatively coupled to the example transceiver B 104B via an optical connection(s). Alternatively, the example transceivers 104A and 104B may be communicatively coupled by an electrical connection(s).

According to the illustrated example, the example transceivers 104A and 104B negotiate a HCD capability for each lane (e.g., a greatest capability (e.g., data rate) supported by the devices at each end of the lane). The example transceivers 104A and 104B additionally communicate negotiated capabilities with each other. The example transceiver A 104A, 104B connected to a multi-lane port (e.g., a multi-lane port that utilizes a single PLL) to which multiple different capability levels are to be used to utilize the HCD for each lane (e.g., the multi-lane port 108 of the example switch 106) communicates and/or controls the communications to facilitate the multiple different capability levels (e.g., instructs the example port 108 to utilize rate-limiting techniques that allow the port 108 to operate a HCD capability level among the multiple lanes).

Figure 2:
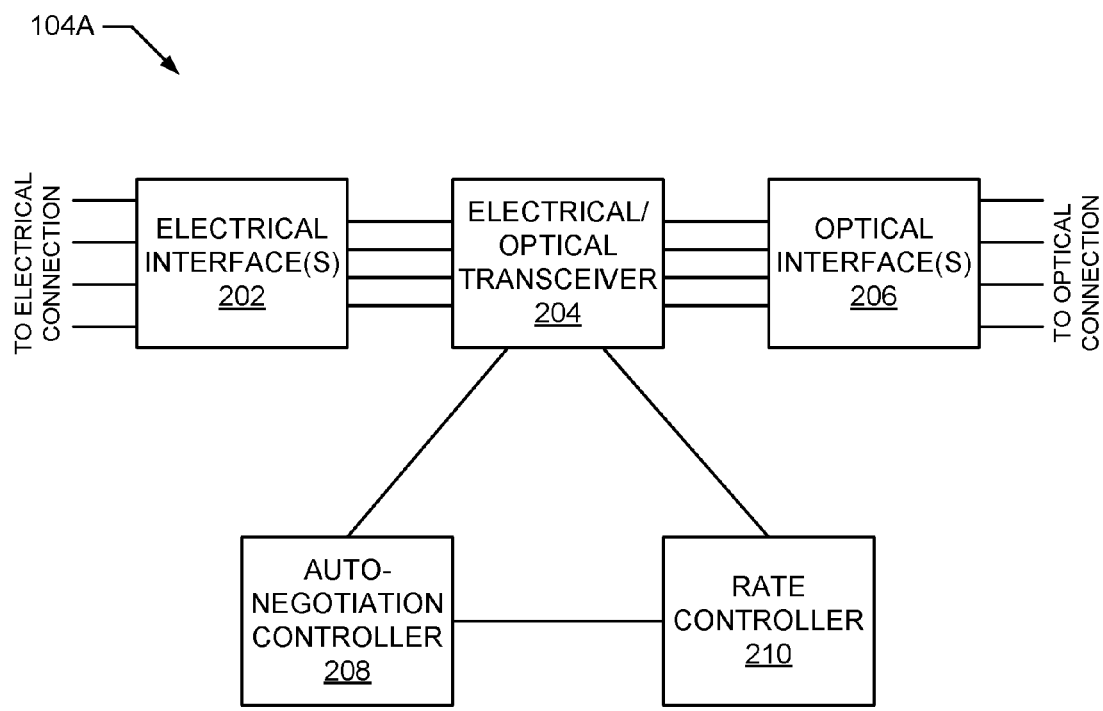
FIG. 2 is a block diagram of an example implementation of the example transceiver A and/or the example transceiver B of FIG. 1.

An example implementation of the example transceivers 104A and 104B is described in conjunction with FIG. 2.

The switch 106 of the illustrated example is a network switch for communicatively coupling a plurality of network devices, lanes, etc. The example switch 106 includes the example port 108 to communicatively couple the example switch 106 with other devices. For example, the example port 108 may be a pluggable port, an embedded optical port, etc. According to the illustrated example, the port 108 shares a PLL among the four example lanes. While a single switch 106 that includes four lanes is shown in FIG. 1, the example switch may be any type of computing device that includes any number of ports 108. Additionally or alternatively, the example port 108 may be included in any other type of computing device.

FIG. 2 is a block diagram of an example implementation of the example transceiver A 104A. Alternatively, the example implementation illustrated in FIG. 2 may be utilized to implement the example transceiver B 104B.

The example transceiver A 104A of FIG. 2 includes an example electrical interface(s) 202, an example electrical/optical transceiver 204, an example optical interface(s) 206, an example auto-negotiation controller 208, and an example rate controller 210.

The example electrical interface(s) 202 communicatively couple the example transceiver A 104A with a computing device. According to the illustrated example, the example electrical interface(s) 202 communicatively couple the example transceiver A 104A with the example servers 102A-102C. Alternatively, the electrical interface(s) 202 may couple the example transceiver A 104A with any other device (e.g., the example switch 106). The electrical interface(s) 202 of the illustrated example is a pluggable interface adapter. Alternatively, the electrical interface(s) 202 may be any other type of interface to a computer device (e.g., the electrical interface(s) 202 may be a circuit trace connection, may be connected via cabling, etc.).

The example electrical interface(s) 202 transmits data received from a computing device to the example electrical/optical transceiver 204. The example electrical interface(s) 202 transmits data received from the example electrical/ optical transceiver 204 to connected computing devices. In the illustrated example, the electrical interface(s) 202 includes a connection for each lane of a multi-lane interface. Alternatively, fewer or more connections may be utilized (e.g., a single multiplexed connection may be utilized).

The example electrical/optical transceiver 204 of the illustrated example converts the electrical connection of the example electrical interface(s) 202 to an optical connection of the optical interface(s) 206 and converts the optical connection of the optical interface(s) 206 to the electrical connection of the electrical interface(s) 202. The example electrical/optical transceiver 204 additionally performs tasks for a physical coding sublayer (PCS) to encode and decode data, scramble and descramble data, etc. The electrical/optical transceiver 204 may perform other tasks for handling of electrical and/or optical signals (e.g., the electrical/optical transceiver 204 may provide optical signal conditioning).

The example optical interface(s) 206 of the illustrated example provide an interface to optical cabling to couple with example transceiver A 104A with a partner transceiver (e.g., the example transceiver B 104B). For example, the example transceiver A 104A may be coupled with and/or integrated within a blade server chassis, server rack, etc. and may be coupled to the example transceiver B 104B via an optical cable, wherein the example transceiver B 104B is coupled with and/or integrated within the example network switch 106. The example transceiver A 104A of FIG. 2 may alternatively include another type of interface to communicatively couple the example transceiver A 104A to the example transceiver B 104B. For example, the example transceiver A 104A and the example transceiver B 104B may be implemented within a single device and, thus, may be directly connected excluding the electrical to optical conversion by the example electrical/optical transceiver 204 and excluding the optical interface(s) 206.

The example auto-negotiation controller 208 (e.g., an auto-negotiation handler, a negotiation controller, etc.) of the illustrated example receives, generates, and processes auto-negotiation messages received from and for transmission to the example connected computing devices (e.g., the example servers 102A-102C, the example switch 106, etc.). The example auto-negotiation controller 208 additionally transmits determined capabilities to the example transceiver B 104B and receives capabilities from the example transceiver B 104B. Based on the information received from the example computing devices and the information receives from the example transceiver B 104B, the example auto-negotiation controller 208 determines the capabilities that may be utilized during communications with the attached computing devices (e.g., determines capabilities that may be utilized for communication on each of multiple lanes in a multi-lane system). For example, the capabilities may include data rate, duplex mode capabilities, flow control capabilities, error correction capabilities, etc. The example auto-negotiation controller 208 transmits and receives auto-negotiation information via the electrical/optical transceiver 204.

The example auto negotiation controller 208 transmits capability information received via auto-negotiation procedures to the example rate controller 210.

The example rate controller 210 of the illustrated example receives capability information from the example auto-negotiation controller 208 and instructs connected computing devices and/or the example transceiver B 104B to use a determined HCD capability. The example rate controller 210 may instruct connected computing devices (e.g., the example servers 102A-102C, the example switch 106 having the example port 108, etc.) to utilize rate limiting on one or more lanes of a multilane system. For example, if the example server C 102C only supports a 10 Gbps connection while the example server A 102A and the example server B 102B support a 25 Gbps connection, the example rate controller 210 will communicate with the example transceiver B 104B to cause the lane of the example port 108 that is associated with the example server C 102C to apply rate limiting so that the example port 108 (e.g., that includes a shared PLL) will be able to operate at 25 Gbps to support the 25 Gbps connections of server A 102A and server B 102B. For example, if the example transceiver illustrated in FIG. 2 is connected with the example switch 106 (e.g., implementing the example transceiver B 104B) the example rate controller 210 instructs the port 108 to apply rate limiting after receiving a request for rate limiting from the example rate controller 210 of the transceiver connected with the servers 102A-102C (e.g., the example transceiver A 104A of FIG. 1). The rate limiting applied to port 108 prevents an actual data throughput out of the port from exceeding 25 Gbps because such a throughput would likely overflow the receive buffers of the example server C 102C that has a maximum capability of 10 Gbps. Likewise, the data output of the example server C 102C, which is limited to 10 Gbps, is converted by the re-timer and presented to port 108 as a 25 Gbps. For example, when the example server C 102C includes a network interface with a maximum capability of 10 Gbps, the example transceiver A 104A will upconvert the 10 Gbps data rate signal to 25 Gbps (e.g., will increase the toggling frequency from a frequency for 10 Gbps Ethernet to a frequency for 25 Gbps Ethernet by inserting idle frames, buffering incoming data until a frame (e.g., a packet) has been received and transmitting a burst at 25 Gbps, etc.). In another example, when the example server C 102C includes a network interface with a maximum capability of 25 Gbps but is rate limited to 10 Gbps (e.g., has an effective data throughput of 10 Gbps due to network connection quality but is still transmitting at a frequency corresponding to 25 Gbps), the example transceiver A 104A may transmit the signal from the example server C 102C to the example transceiver B 104B without conversion. Throughout the disclosure, any instance in which a slower data rate signal is to be transmitted to a system utilizing a higher data rate, any of the foregoing techniques may be utilized.

In examples disclosed herein, a transceiver may communicate with a higher capability device (e.g., the switch port 108 as compared with the example server C 102C) and may utilize a capability that meets or exceeds the capabilities of other connected devices. For example, according to the illustrated example of FIG. 1, the example port 108 may support data rates of 10 Gbps, 25 Gbps, 50 Gbps, and 100 Gbps per lane. Having learned that the example servers 102A-102C support between 10 Gbps and 25 Gbps, the example transceiver A 104A, the example transceiver B, and the example port 108 may communicate at 25 Gbps, 50 Gbps, and 100 Gbps per lane. Alternatively, in some implementations, the example transceiver A 104A, the example transceiver B, and the example port 108 may elect to communicate at the fastest data rate of the example servers 102A-102C (e.g., 25 Gbps).

While an example manner of implementing the transceiver A 104A and/or the example transceiver B 104B of FIG. 1 is illustrated in FIG. 2, one or more of the elements, processes and/or devices illustrated in FIG. 2 may be combined, divided, re-arranged, omitted, eliminated and/or implemented in any other way. Further, the example electrical interface(s) 202, the example electrical/optical transceiver 204, the example optical interface(s) 206, the example auto-negotiation controller 208, the example rate controller 210, and/or, more generally, the example transceiver A 104A of FIG. 2 may be implemented by hardware, software, firmware and/or any combination of hardware, software and/or firmware. Thus, for example, any of the example electrical interface(s) 202, the example electrical/optical transceiver 204, the example optical interface(s) 206, the example auto-negotiation controller 208, the example rate controller 210, and/or, more generally, the example transceiver A 104A of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, electrical interface(s) 202, the example electrical/optical transceiver 204, the example optical interface(s) 206, the example auto-negotiation controller 208, the example rate controller 210, and/or, more generally, the example transceiver A 104A of FIG. 2 is/are hereby expressly defined to include a tangible computer readable storage device such as a memory, etc. storing the software and/or firmware. Further still, the example transceiver A 104A and/or the example transceiver B 104B of FIG. 1 may include one or more elements, processes and/or devices in addition to, or instead of, those illustrated in FIG. 2, and/or may include more than one of any or all of the illustrated elements, processes and devices.

Figure 3:
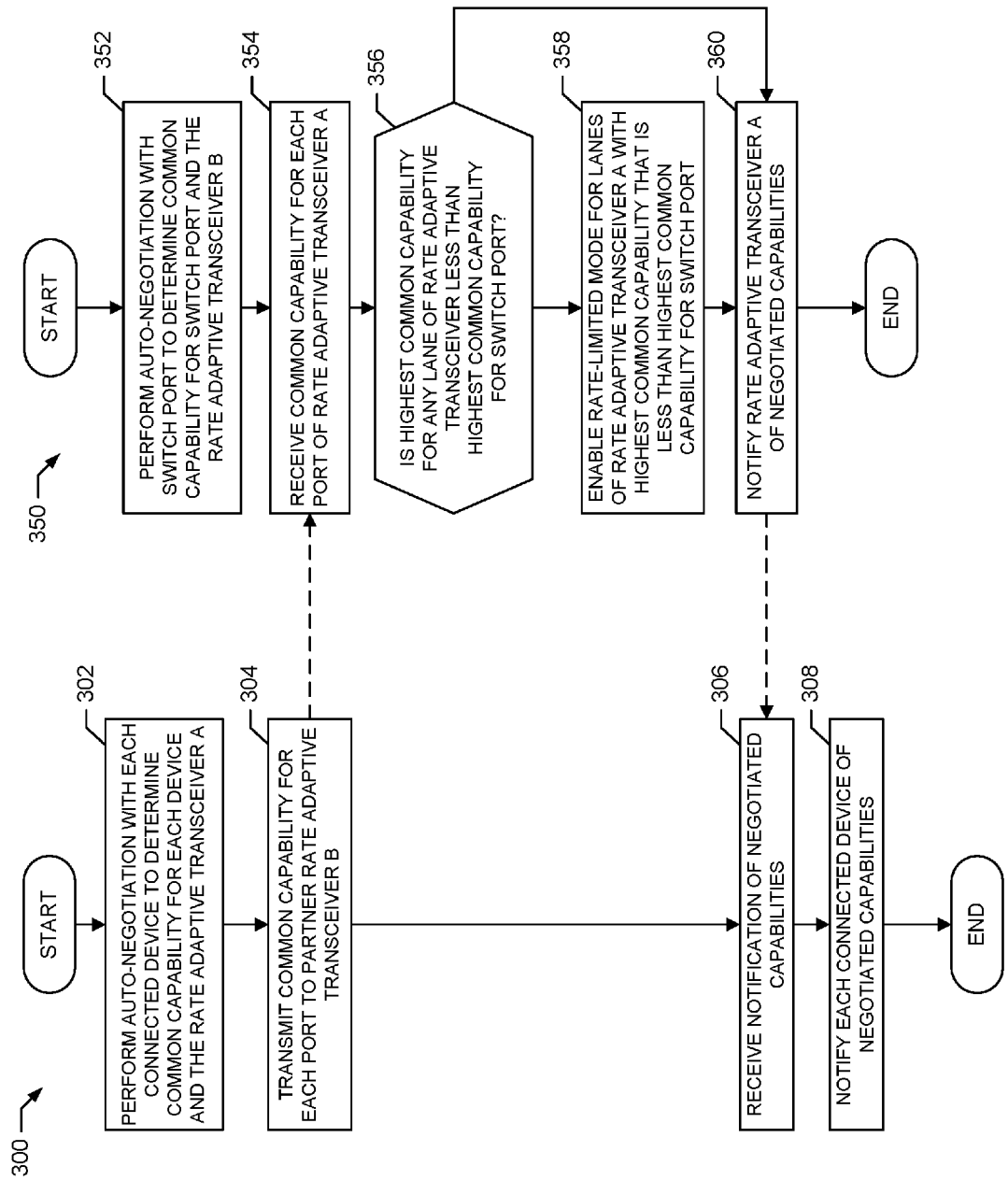
FIGS. 3-5 depict flowcharts of example processes that may be used to implement the example transceivers of FIGS. 1-2
Figure 4:
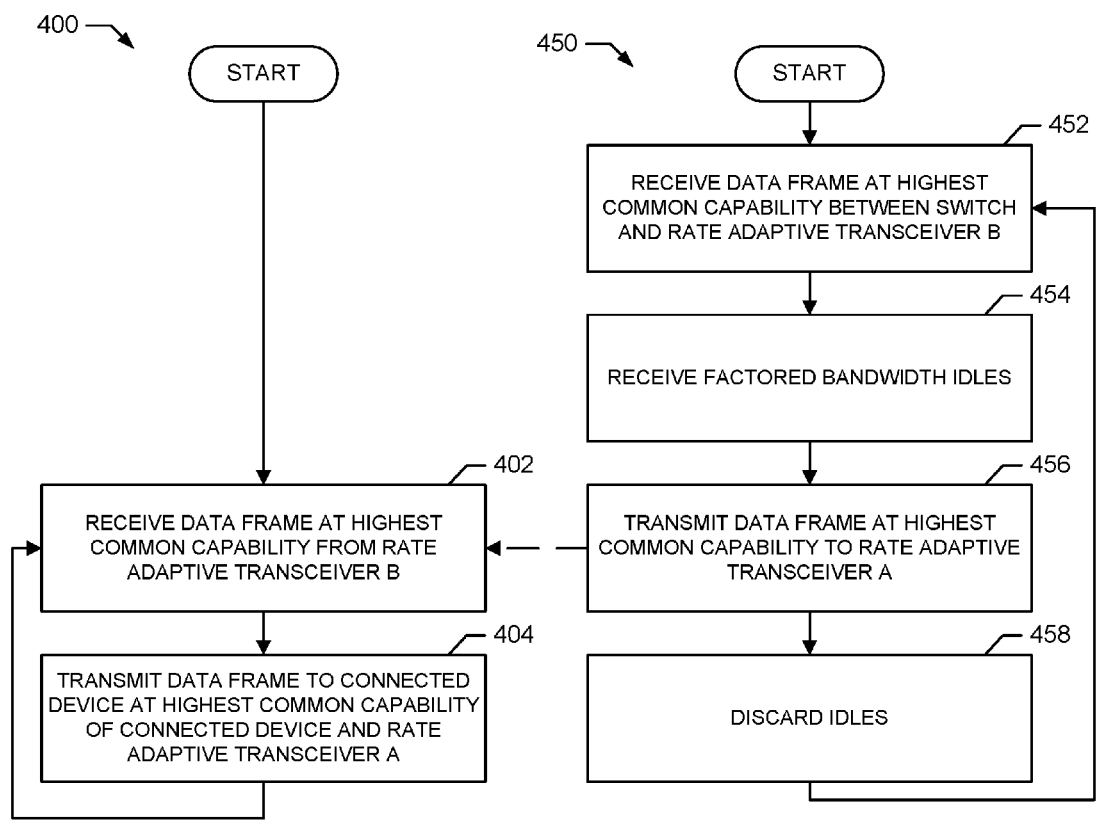
Figure 5:
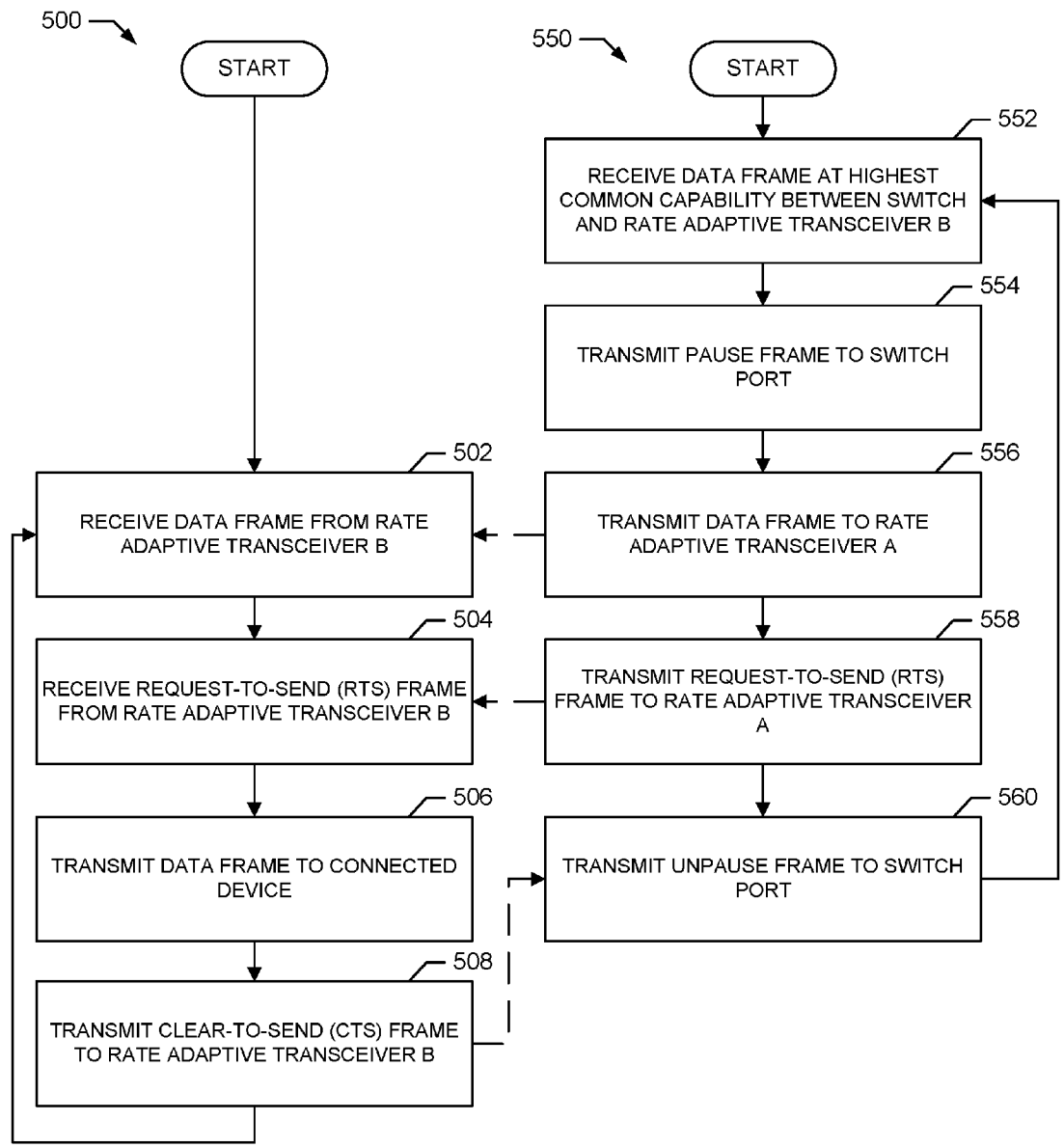

Flowcharts representative of example machine readable instructions for implementing the example transceiver A 104A and/or the example transceiver B 104B of FIG. 1 are shown in FIGS. 3-5. In these examples, the machine readable instructions comprise program(s) for execution by a processor such as the processor 1112 shown in the example processor platform 1100 discussed below in connection with FIG. 11. The program(s) may be embodied in software stored on a tangible computer readable storage medium such as a memory associated with the processor 1112, but the entire program(s) and/or parts thereof could alternatively be executed by a device other than the processor 1112 and/or embodied in firmware or dedicated hardware. Further, although the example program(s) is described with reference to the flowchart illustrated in FIGS. 3-5, many other methods of implementing the example transceiver A 104A and/or the example transceiver B 104B may alternatively be used. For example, the order of execution of the blocks may be changed, and/or some of the blocks described may be changed, eliminated, or combined.

As mentioned above, the example processes of FIGS. 3-5 may be implemented using coded instructions (e.g., computer and/or machine readable instructions) stored on a tangible computer readable storage medium such as a flash memory, a read-only memory (ROM), a cache, a random-access memory (RAM) and/or any other storage device in which information is stored for any duration (e.g., for extended time periods, permanently, for brief instances, for temporarily buffering, and/or for caching of the information). As used herein, the term tangible computer readable storage medium is expressly defined to include any type of computer readable storage device and to exclude propagating signals and to exclude transmission media. As used herein, "tangible computer readable storage medium" and "tangible machine readable storage medium" are used interchangeably. Additionally or alternatively, the example processes of FIGS. 3-5 may be implemented using coded instructions (e.g., computer and/or machine readable instructions) stored on a non-transitory computer and/or machine readable medium such as a flash memory, a read-only memory, a cache, a random-access memory and/or any other storage device in which information is stored for any duration (e.g., for extended time periods, permanently, for brief instances, for temporarily buffering, and/or for caching of the information). As used herein, the term non-transitory computer readable medium is expressly defined to include any type of computer readable storage device and to exclude propagating signals and to exclude transmission media. As used herein, when the phrase "at least" is used as the transition term in a preamble of a claim, it is open-ended in the same manner as the term "comprising" is open ended.

FIG. 3 includes a first flowchart 300 illustrating operations performed by the example transceiver that is connected to the servers 102A-102C in FIG. 1 (e.g., the example transceiver A 104A of FIG. 1) and a second flowchart 350 illustrating operations performed by the example transceiver that is connected to the example switch 106 in FIG. 1 (e.g., the example transceiver B 104B of FIG. 1). The flowcharts of FIG. 3 include dashed lines to illustrate points at which information relevant to the illustrated processes is transferred between the transceivers. For clarity, the example flowchart 300 will be described first followed by a description of the example flowchart 350.

The process illustrated by the example flowchart 300 begins when the example auto-negotiation controller 208 performs an auto-negotiation with each of the devices connected (e.g., the servers 102A-102C) to the example transceiver A 104A (block 302). The auto-negotiation controller 208 transmits auto-negotiation information to, and receives auto-negotiation information, from the connected devices via the example electrical interface(s) 202. The example auto-negotiation controller 208 determines the common capabilities for each lane via the auto-negotiation process (e.g., initiates an auto-negotiation to determine capabilities of the connected devices and then terminates the auto-negotiation without communicating a selected common capability to the connected devices). For example, if the example transceiver A 104A supports data rates of 10 Gbps and 25 Gbps and the example server C 102C only supports data rates of 10 Gbps, the capability that is commonly supported for the lane associated with the example server C 102C is 10 Gbps. Each of the lanes to the example transceiver A 104A may utilize a different capability.

The example auto-negotiation controller 208 then transmits the example determined common capabilities for each lane to the partner transceiver (e.g., the example transceiver B 104B) (block 304).

The example auto-negotiation controller of the example transceiver A 104A then receives a notification of common capabilities from the example transceiver B 104B via the example optical interface(s) 206 and the example electrical optical transceiver 204 (block 306). The example auto-negotiation controller 208 then determines a single common capability between its own common capabilities and those received from the example transceiver B 104B and notifies each of the connected devices of the negotiated capabilities (block 308). For example, the auto-negotiation controller 208 of the illustrated example, selects a highest common capability and initiates an auto-negotiation process with each of the connected devices during which the auto-negotiation controller 208 only advertises the selected highest common capability to each of the connected devices.

The process illustrated in the example flowchart 350 is described as being performed by the example transceiver B 104B. Accordingly, the reference to the blocks of FIG. 2 is in reference to an implementation wherein the blocks of FIG. 2 implement the example transceiver B 104B.

The process illustrated in the example flowchart 350 begins when the example auto-negotiation controller 208 initiates an auto-negotiation with the example port 108 of the example switch 106 (block 352). The example auto-negotiation controller 208 receives the capabilities of the example port 108 via the example electrical interface(s) 202 and the example electrical/optical transceiver 204. For example, the example auto-negotiation controller 208 may determine that the port 108 supports up to 25 Gbps communications.

The example auto-negotiation controller 208 of the example transceiver B 104B receives common capability information for each lane connecting devices to the example transceiver A 104A via the example optical interface(s) 206 and the example electrical/optical transceiver 204, (block 354). For example, according to the illustrated example, the auto-negotiation controller 208 is notified that each of the two lanes connected to the example server A 102A and the lane connected to the example server B 102B may operate at 10 Gbps per lane or 25 Gbps per lane, but the lane connected to the example server C 102C may only operate at 10 Gbps (e.g., data destined for the example server C 102C may be transmitted through and within the example transceiver A 104A and the example transceiver B 104 B at any data rate (e.g., any clocked data rate) but the effective data rate (e.g., after removing idle frames), cannot exceed 10 Gbps so that the data rate between the example transceiver A 104A and the example server C 102C is 10 Gbps or less because of the capability limit of the example server C 102C). In return, data transmitted from the example server C 102C at 10 Gbps will be upconverted using any of the previously disclosed techniques or any other technique to transmit the data from the example transceiver A 104A to the example transceiver B 104B at 25 Gbps.

The example auto-negotiation controller 208 then determines if the highest common capability for any lane connecting the example transceiver A 104A and one of the example servers 102A-102C is less than a highest common capability for the example transceiver B 104B and the example port 108 of the example switch 106 (block 356). If the highest common capability for any lane is not less than the highest common capability of the port 108 (e.g., all lanes have the same maximum data rate as the port 108), control proceeds to block 360.

If the highest common capability of a lane(s) connecting the example transceiver A 104A and one of the example servers 102A-102C is less than the highest common capability between the example transceiver B 104B and the port 108, then the example rate controller 210 enables rate-limited mode for those lanes that have a lower common capability (block 358). For example, rate-limiting may be applied by adding idle frames, performing flow-control, etc. The rate-limiting may be applied by controlling the port 108 and/or the switch 106 (e.g., by the rate controller 210 causing the auto-negotiation controller 208 to transmit auto-negotiation information requesting rate-limiting to the example port 108), by performing rate-limiting at the example transceiver B 104B (e.g., by the rate controller 210 controlling the operation of the example transceiver B 104B), and/or by performing rate-limiting at the example transceiver A 104A (e.g., by the rate controller 210 controlling the operation of the example transceiver A 104A). Example processes for performing rate-limiting are described in conjunction with FIGS. 4 and 5.

After the example auto-negotiation controller 208 determines that the example rate controller is not to enable rate-limiting (block 356) and/or the example rate controller 210 enables rate limiting (block 358), the example auto-negotiation controller 208 notifies the example transceiver A 104A of the negotiated capabilities for the lanes (block 360). For example, the auto-negotiation controller 208 may notify the transceiver A 104A that the two lanes connected to the example server A 102A and the lane connected to the example server B 102B will operate at 25 Gbps (because the port 108 supports a 25 Gbps data rate) and the lane connected to the example server C 102C will operate at rate-limited 10 Gbps (because the example server C 102C only supports a 10 Gbps data rate).

Accordingly, even if the port 108 of switch 106 is a multi-lane port that uses a single PLL and must operate at a given clock rate (e.g., a clock rate corresponding with 25 Gbps), the example transceiver A 104A and the example transceiver B 104B ensure that the connection of a device that supports a lower data rate (e.g., 10 Gbps) does not limit the data rate for all devices to 10 Gbps (e.g., the PLL would otherwise operate at a data rate corresponding to 10 Gbps if 10 Gbps was the highest data rate supported by at least one device).

FIG. 4 includes a first flowchart 400 illustrating operations performed by the example transceiver that is connected to the servers 102A-102C in FIG. 1 (e.g., the example transceiver A 104A of FIG. 1) and a second flowchart 450 illustrating operations performed by the example transceiver that is connected to the example switch 106 in FIG. 1 (e.g., the example transceiver B 104B of FIG. 1). The flowcharts of FIG. 4 include dashed lines to illustrate points at which information relevant to the illustrated processes is transferred between the transceivers. For clarity, the example flowchart 450 will be described first followed by a description of the example flowchart 400.

The processes illustrated in FIG. 4 are performed after the auto-negotiation processes of FIG. 3 have been performed and rate-limiting was enabled. According to the illustrated example, of FIG. 4, rate-limiting was enabled by instructing the example port 108 of the example switch 106 to insert idle frames in rate-limited lanes. For example, if the port 108 is operating at 25 Gbps but one lane is to operate at 10 Gbps, the switch 106 inserts idle frames among the actual data transmission to ensure that the effective rate of the does not exceed 10 Gbps (e.g., after the idle frames are excluded).

The process illustrated by the example flowchart 450 begins when the example electrical/optical transceiver 204 of the example transceiver B 104B receives, via the example optical interface(s) 206, a data frame at a highest common capability between the example switch 106 and the example transceiver B 104B (block 452). For example, the switch 106 may transmit data to the example transceiver B 104B at 25 Gbps on all lanes of the example multi-lane port 108. The example electrical/optical transceiver 204 of the example transceiver B 104B receives, via the example optical interface(s) 206, a factored bandwidth idle(s) from the example port 108 (block 454). While the example flowchart includes receipt of a single data frame followed by receipt of a single idle frame, any number, order, and combination of data frames and idle frames may be received and processed.

The example electrical/optical transceiver 204 transmits the data frame to the example transceiver A 104A via the example electrical interface(s) 202 (block 456). The example rate controller 210 causes the example electrical/optical transceiver 204 to discard the idle(s) without transmission (block 458). Control then returns to block 452 to process a next received frame. Accordingly, because the idles are removed, the effective rate of data transfer is reduced to the maximum data rate at which the lane is capable of operating (e.g., 10 Gbps data rate associated with the example server 102C).

Turning to the flowchart 400, the example electrical/optical transceiver 204 of the example transceiver A 104A receives, via the example optical interface(s) 206, the data frame from the example transceiver B 104B at the highest common capability rate of the transceiver B and the example port 108 (e.g., 25 Gbps) (block 402). The example electrical/optical transceiver 204 transmits the data frame to the connected device (e.g., the example server C 102C) at the highest common capability rate between the example server C 102C and the example transceiver A 104A (e.g., 10 Gbps) (block 404). For example, the example electrical/optical transceiver 204 may buffer the transmissions received at 25 Gbps to transmit the data at 10 Gbps. However, because the idle frames are removed by the example transceiver B 104B, a receiver buffer of the example electrical/optical transceiver 204 is not overrun if sufficient idles are inserted to keep the effective transfer rate below 10 Gbps.

In some examples, the idle frames may be removed at other points during the transmission from the example port 108 to the example server C 102C via the example transceivers 104A, 104B. For example, the idle frames may be transmitted from the example transceiver B 104B to the example transceiver A 104A and the example rate controller 210 of the example transceiver A 104A may cause the idle frames to be discarded.

FIG. 5 includes a first flowchart 500 illustrating operations performed by the example transceiver that is connected to the servers 102A-102C in FIG. 1 (e.g., the example transceiver A 104A of FIG. 1) and a second flowchart 550 illustrating operations performed by the example transceiver that is connected to the example switch 106 in FIG. 1 (e.g., the example transceiver B 104B of FIG. 1). The flowcharts of FIG. 5 include dashed lines to illustrate points at which information relevant to the illustrated processes is transferred between the transceivers. For clarity, the example flowchart 550 will be described first followed by a description of the example flowchart 500.

The processes illustrated in FIG. 5 are performed after the auto-negotiation processes of FIG. 3 have been performed and rate-limiting was enabled. According to the illustrated example, of FIG. 5, rate-limiting was enabled by enabling rate-limiting at the example transceiver B 104B. In such an example, as shown in FIG. 5, the example transceiver B 104B controls the data rate through the use of PAUSE frames. For example, if the port 108 is operating at 25 Gbps but one lane is to operate at 10 Gbps, the example transceiver B 104B transmits PAUSE frames to the example switch 106 to cause the effective transfer rate to be less than 10 Gbps.

The process illustrated by the example flowchart 550 begins when the example electrical/optical transceiver 204 of the example transceiver B 104B receives, via the example optical interface(s) 206, a data frame at a highest common capability between the example switch 106 and the example transceiver B 104B (block 552). For example, the switch 106 may transmit data to the example transceiver B 104B at 25 Gbps on all lanes of the example multi-lane port 108. While the example flowchart includes receipt of a single data frame before moving to block 554, any number of data frames may be received and processed.

In response to receiving the data frame (block 552), the example rate controller 210 transmits a PAUSE frame to the example port 108 for the lane(s) that are to be rate-limited (block 554). The PAUSE frame causes the example port 108 to delay transmission of further data frames until an UNPAUSE frame is received. Accordingly, through the use of the PAUSE frames, the example rate controller 210 can ensure that the data transmissions do not exceed an effective rate of, for example, 10 Gbps (e.g., to prevent a buffer overrun when the example transceiver A 104A communicates with the example server C 102C at 10 Gbps instead of the 25 Gbps rate utilized by the example port 108).

The example electrical/optical transceiver 204 transmits the received data frame to the example transceiver A 104A via the example electrical interface(s) 202 (block 556). The example rate controller 210 then transmits a Request-To-Send (RTS) frame to the example transceiver A 104A (block 558). The example transceiver B 104B then awaits receipt of a Clear-To-Send (CTS) frame from the example transceiver A 104A. In response to receiving the Clear-To Send frame from the example transceiver A 104A, the example rate controller 210 transmits an UNPAUSE frame to the example port 108 via the example electrical/optical transceiver 204 and the example electrical interface(s) 202 (block 560).

Turning to the flowchart 500, the example electrical/optical transceiver 204 of the example transceiver A 104A receives, via the example optical interface(s) 206, the data frame from the example transceiver B 104B at the highest common capability rate of the transceiver B and the example port 108 (e.g., 25 Gbps) (block 502). The example rate controller 210 of the example transceiver A 104A receives, via the example optical interface(s) 206 and the example electrical/optical transceiver 204, the Request-To-Send frame from the example transceiver B 104B (block 504). The example electrical/optical transceiver 204 transmits the data frame to the connected device (e.g., the example server C 102C) at the highest common capability rate between the example server C 102C and the example transceiver A 104A (e.g., 10 Gbps) (block 506). For example, the example electrical/optical transceiver 204 may buffer the transmissions received at 25 Gbps to transmit the data at 10 Gbps. However, because the port 108 has been sent a PAUSE frame by the example transceiver B 104B, the buffer is not overrun. After transmission of the data frame to the connected device has completed (or after transmission of a sufficient portion of the data frame so that a buffer has room for be filled with another data frame), the example rate controller 210 transmits a Clear-To-Send frame to the example transceiver B 104B (block 508). The example Clear-To-Send frame notifies the example transceiver B 104B that the example port 108 can be UNPAUSED and further data frames may be transmitted. Control returns to block 502 to await reception of a further data frame.

Thus, the example transceivers 104A and 104B utilize pause/UNPAUSE and RTS/CTS to rate-limit a lane of data transmission between the port 108 and the servers 102A-102C so that the lane may operate at a data rate that exceeds the maximum data rate capability of one of the example servers 102A-102C (e.g., so that lanes connected to servers that support a higher data rate can operate at the higher data rate even if the port 108 is limited to operating at a single rate for all lanes (e.g., if the port 108 is a multi-lane port that is connected to a single PLL)). While pause/UNPAUSE frames are described, any notifications that start and stop transmission of data frames may be utilized. Similarly, while RTS/CTS frames are described, any requests/notifications that allow one of the example transceivers 104A, 104B to notify another one of the example transceivers 104A, 104B that further data frames can be transmitted may be utilized.

Figure 6:
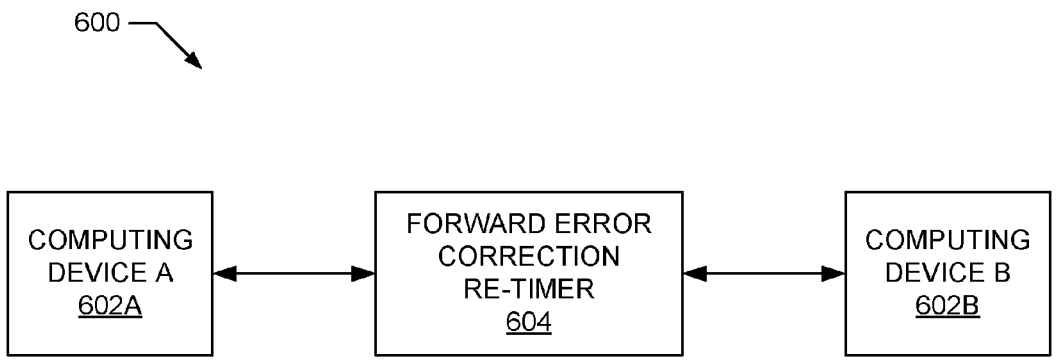
FIG. 6 is a block diagram of an example environment in which a re-timer is interconnected between a first computing device A and a second computing device B.

FIG. 6 is a block diagram of an example environment 600 in which a re-timer 604 is interconnected between a first computing device A 602A and a second computing device B 602B.

The computing devices 602A and 602B of the illustrated example are any computing devices that are communicatively coupled via a network connection. For example, the computing devices 602A and 602B may be a computer, a server, a switch, etc. For example, one or both of the computing devices 602A and 602B may be one of the example servers 102A-102B, one of the example transceivers 104A, 104B, and/or the example port 108 of the example switch 106 of FIG. 1.

The example re-timer 604 performs re-timing of data transmitted from one of the computing devices 602A, 602B to the other of the computing devices 602A, 602B. For example, the physical distance between the example computing devices 602A and 602B may be beyond the electrical drive capability of the network transmitter of the example computing devices 602A, 602B. Accordingly, the example re-timer 604 is located intermediate the computing devices 602A, 602B to receive the electrical transmission, recover a clock for the data, re-time the data accurately, and transmit the data onward to the destination.

In addition to providing re-timing functionality consistent with typical Ethernet re-timers, the example re-timer 604 supports the ability for one of the computing devices 602A, 602B to utilize a capability or protocol that is not utilized by the other one of the computing devices 602A, 602B. According to the illustrated example, the capability that is handled by the example re-timer 604 is the use of forward error correction (FEC) code. FEC is an error correction technique in which a sender encodes a message in a redundant way using an error-correcting code (ECC). The redundancy provided by FEC allows a receiver of a message to detect errors that may occur in a message transmission and to correct the errors without further retransmission of the message.

According to the illustrated example, the example computing device A 602A supports and is configured to request that FEC be utilized. However, the example computing device B 602B does not support FEC and/or is configured to not utilize FEC. In typical re-timers, auto-negotiation information from the example computing device A 602A is passed through to the example computing device B 602B and, thus, computing device A 602A will learn that computing device B 602B does not support or otherwise does not enable FEC. Accordingly, FEC will not be utilized by the example computing device A 602A when communicating with the example computing device B 602B. However, it may be desirable to utilize FEC in the link between the example computing device A 602A and the example re-timer 604 even when FEC is not utilized between the example computing device B 602B. For example, the link between the example computing device A 602A and the example re-timer 604 may be a greater distance than the link between the example re-timer 604 and the example computing device B 602B.

To facilitate the asymmetric utilization of a capability such as FEC (e.g., selection of different modes of FEC such as FEC enabled, FEC disabled, FEC enabled for Clause 74, FEC enabled for Clause 91 (e.g., Reed-Solomon Forward Error Correction in Clause 91), etc.), the example re-timer 604 participates in the auto-negotiation process rather than passing through the auto-negotiation messages without participation. Accordingly, the example re-timer may report to one computing device 602A, 602B that a capability may be supported on one link even if the capability is not supported on the other link.

Figure 7:
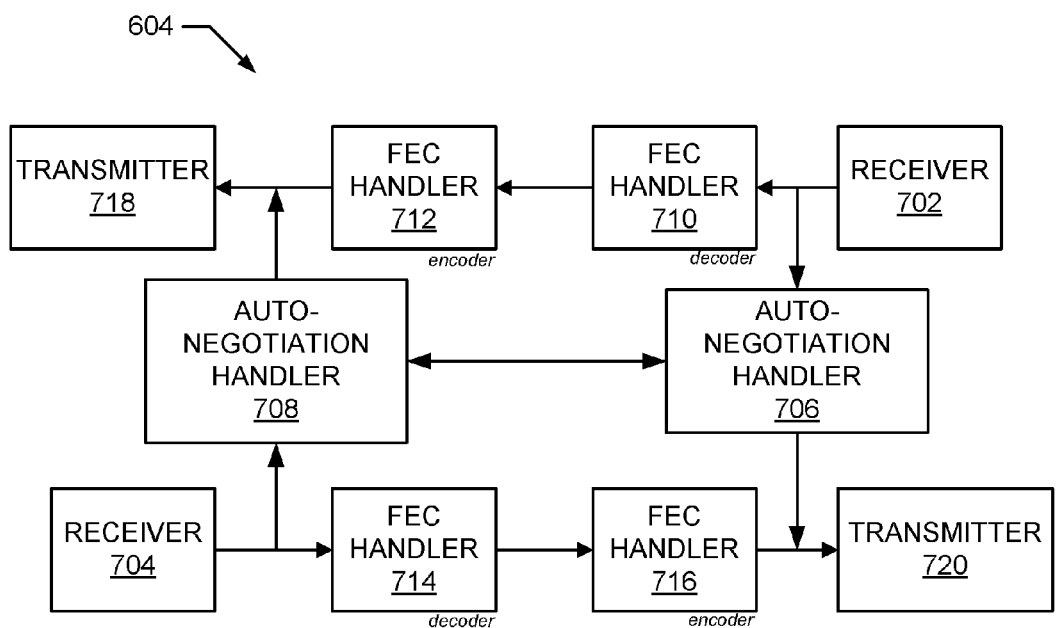
FIG. 7 is a block diagram of an example implementation of the example re-timer of FIG. 6.

FIG. 7 is a block diagram of an example implementation of the example re-timer 604 of FIG. 6. The example re-timer 604 of FIG. 7 includes a first example receiver 702, a second example receiver 704, a first example auto-negotiation handler 706, a second example auto-negotiation handler 708, a first example FEC handler 710, a second example FEC handler 712, a third example FEC handler 714, a fourth example FEC handler 716, a first example transmitter 718, and a second example transmitter 720.

The top row of FIG. 7 (blocks 702, 710, 712, and 718) handle data transmitted from the example computing device B 602B and the bottom row of FIG. 7 (blocks 704, 714, 716, 720) handle data transmitted from the example computing device A 602A. According to the illustrated example, each of the top and bottom path provide the same functionality. In some examples, some of the components may be re-used to handle communications in both directions to avoid redundant components.

The example first receiver 702 and the example second receiver 704 of the illustrated example receive data and auto-negotiation information from a connected device (e.g., the example computing devices 602A, 602B). For example, the example first receiver 702 and the example second receiver 704 may de-multiplex received communications to obtain the auto-negotiation information. The example receivers 702, 704 transmit the received auto-negotiation information (e.g., auto-negotiation information in accordance with IEEE 802.3) to the example auto-negotiation handler 706 or the example auto-negotiation handler 708, respectively. The example receivers 702, 704 transmit data to the example first FEC handler 710 or the example third FEC handler 714, respectively.

According to the illustrated example, the receivers 702, 704 are implemented by interfaces to electrical network connections (e.g., any type of wired Ethernet connection). Alternatively, one or both of the receivers 702, 704 may interface with any other type of connection media (e.g., an optical connection).

The example first auto-negotiation handler 706 and the example second auto-negotiation handler 708 perform independent auto-negotiations with the connected devices. For example, the example first auto-negotiation handler 706 receives auto-negotiation information from the example computing device B 602B via the example first receiver 702 and transmits auto-negotiation information to the example computing device B 602B via the example second transmitter 720. Likewise, the example second auto-negotiation handler 708 receives auto-negotiation information from the example computing device A 602A via the example second receiver 704 and transmits auto-negotiation information to the example computing device A 602A via the example first transmitter 718. Using the auto-negotiation process (e.g., the auto-negotiation process set forth in IEEE 802.3), the example auto-negotiation handlers 706, 708 exchange information with the computing devices 602A, 602B to determine the capabilities of the example computing devices 602A, 602B and to inform the example computing devices 602A, 602B and the example FEC handlers 710-716 of the capabilities of the communications with the example re-timer 604 (e.g., based on the capabilities of the example re-timer 604 and the capabilities of the connected devices 602A, 602B). The example first auto-negotiation controller 706 and the example second auto-negotiation handler 708 exchange information (as set forth in the process illustrated by the flowchart of FIGS. 8-10).

The example FEC handlers 710-716 perform encoding and/or decoding of communications received from the example computing devices 602A, 602B and communications to be transmitted to the example computing devices 602A, 602B. For example, according to the illustrated example, the example first FEC handler 710 and the example third FEC handler 714 are FEC decoders (e.g., when FEC encoding is included in communications received from the example first receiver 702 and/or the example second receiver 704, respectively). According to the illustrated example, the example second FEC handler 712 and the example fourth FEC handler 716 are FEC encoders (e.g., when FEC encoding is to be included in in communications transmitted by the example first transmitter 718 and/or the example second transmitter 720, respectively). According to the illustrated example, the multiple FEC handlers 710, 712, 714, 716 facilitate the handling of different FEC capabilities (e.g., FEC enabled or disabled, different FEC types, etc.) between the example computing devices 602A, 602B. For example, when the computing device A 602A negotiates with the example second auto-negotiation handler 708 to utilize FEC Clause 74 and the example computing device B 602B negotiates with the example first auto-negotiation handler 706 to not utilize FEC, the example third FEC handler 714 decodes received FEC Clause-74 communications, the example second FEC handler 712 encodes communications to be transmitted with the example transmitter 718 in FEC Clause 74, and the example first FEC handler 710 and the example fourth FEC handler 716 perform no FEC operations (e.g., act as an FEC bypass). In an example in which the example second computing device B 602B is to utilize FEC Clause 91, the example first FEC handler 710 decodes received communications utilizing FEC Clause-91 and the example fourth FEC handler 716 encodes communications utilizing FEC Clause 91.

The example first transmitter 718 and the example second transmitter 720 of the illustrated example transmit data and auto-negotiation information to a connected device (e.g., the example computing devices 602A, 602B). For example, the example first transmitter 718 and the example second transmitter 720 may multiplex data and auto-negotiation information to utilize a shared electrical link with the example computing devices 602A, 602B.

While FIG. 7 illustrates an example implementation of the re-timer 604 as a single apparatus, the re-timer 604 may be implemented by multiple apparatus. For example, the example first receiver 702, the example first auto-negotiation handler 706, the example first FEC handler 710, the example fourth FEC handler 716, and the example second transmitter 720 may be implemented as a first apparatus. In such an implementation, the example second receiver 704, the example second auto-negotiation handler 708, the example second FEC handler 712, the example third FEC handler 714, and the example first transmitter 718 may be implemented as a second apparatus. The example first apparatus and the example second apparatus may be communicatively coupled (e.g., the example first FEC handler 710 may be communicatively coupled with the example second FEC handler 712 and the example third FEC handler 714 may be communicatively coupled with the example fourth FEC handler 716 via one or more connections and/or interfaces such as electrical connection(s), optical connection(s), etc.).

While an example manner of implementing the re-timer 604 of FIG. 6 is illustrated in FIG. 7, one or more of the elements, processes and/or devices illustrated in FIG. 7 may be combined, divided, re-arranged, omitted, eliminated and/or implemented in any other way. Further, the first example receiver 702, the second example receiver 704, the first example auto-negotiation handler 706, the second example auto-negotiation handler 708, the first example FEC handler 710, the second example FEC handler 712, the third example FEC handler 714, the fourth example FEC handler 716, the first example transmitter 718, and the second example transmitter 720, and/or, more generally, example re-timer 604 of FIG. 7 may be implemented by hardware, software, firmware and/or any combination of hardware, software and/or firmware. Thus, for example, any of the first example receiver 702, the second example receiver 704, the first example auto-negotiation handler 706, the second example auto-negotiation handler 708, the first example FEC handler 710, the second example FEC handler 712, the third example FEC handler 714, the fourth example FEC handler 716, the first example transmitter 718, and the second example transmitter 720, and/or, more generally, example re-timer 604 of FIG. 7 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the first example receiver 702, the second example receiver 704, the first example auto-negotiation handler 706, the second example auto-negotiation handler 708, the first example FEC handler 710, the second example FEC handler 712, the third example FEC handler 714, the fourth example FEC handler 716, the first example transmitter 718, and the second example transmitter 720, and/or, more generally, example re-timer 604 of FIG. 7 is/are hereby expressly defined to include a tangible computer readable storage device such as a memory, etc. storing the software and/or firmware. Further still, the example re-timer 604 of FIG. 6 may include one or more elements, processes and/or devices in addition to, or instead of, those illustrated in FIG. 7, and/or may include more than one of any or all of the illustrated elements, processes and devices.

Figure 8:
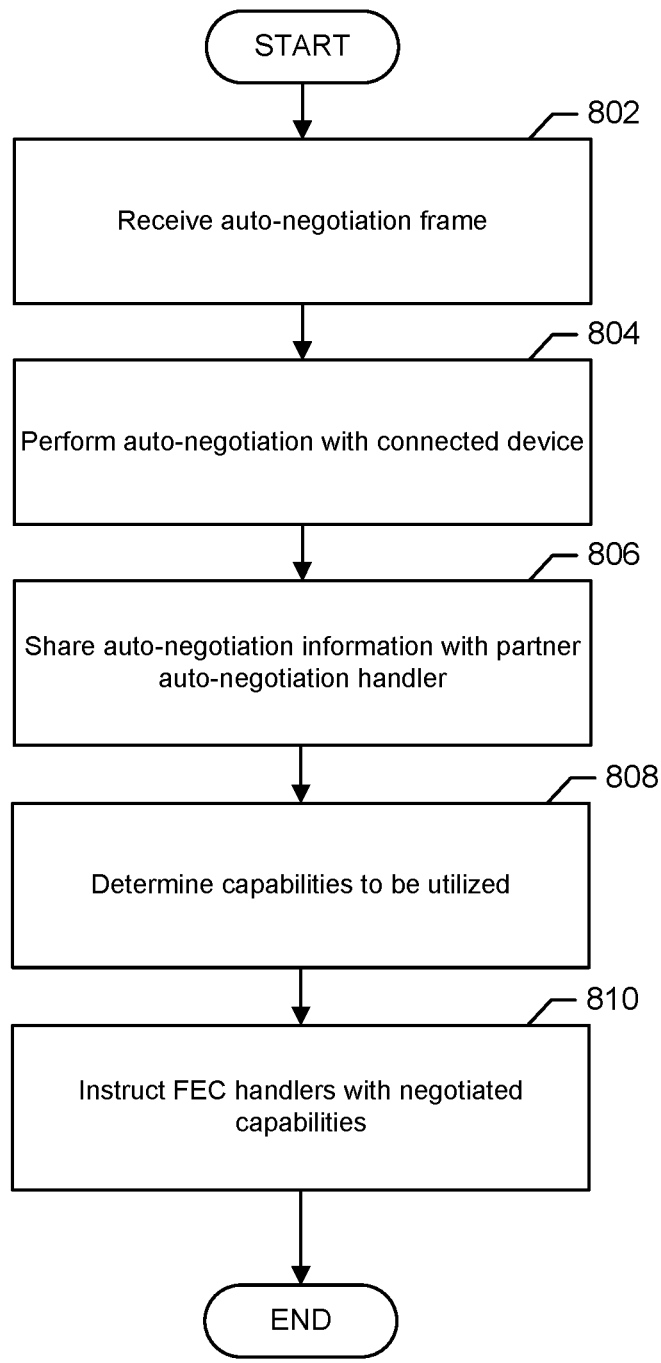
FIGS. 8-9 depict flowcharts of example processes that may be used to implement the example re-timer of FIGS. 6-7.
Figure 9:
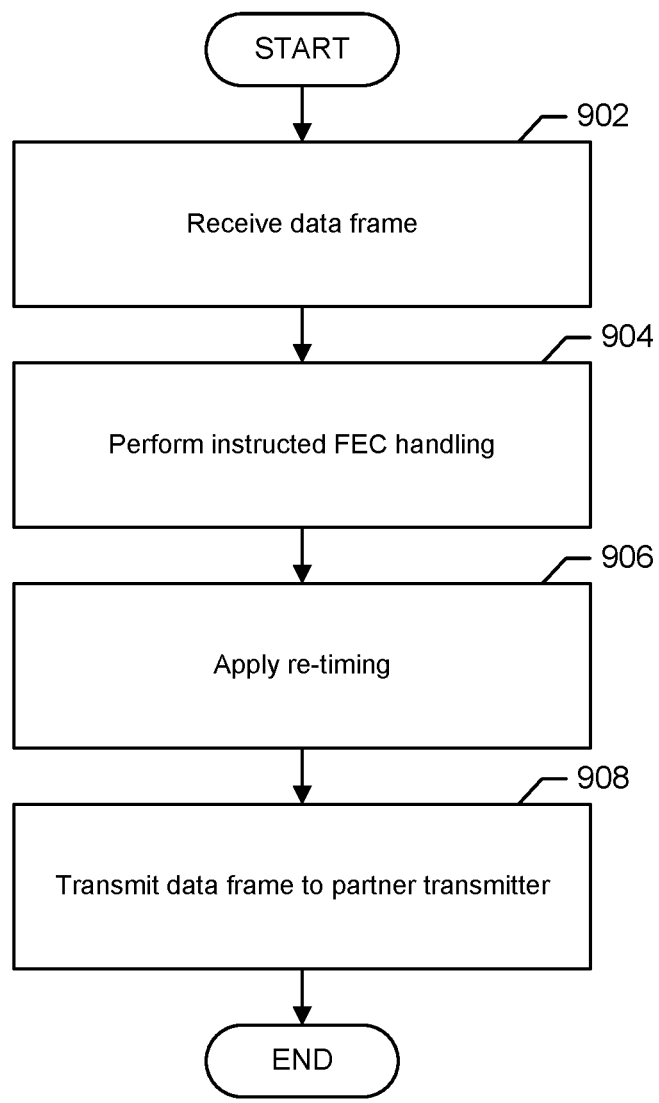

Flowcharts representative of example machine readable instructions for implementing the re-timer 604 of FIG. 6 are shown in FIGS. 8-9. In these examples, the machine readable instructions comprise program(s) for execution by a processor such as the processor 1212 shown in the example processor platform 1200 discussed below in connection with FIG. 12. The program(s) may be embodied in software stored on a tangible computer readable storage medium such as a memory associated with the processor 1212, but the entire program(s) and/or parts thereof could alternatively be executed by a device other than the processor 1212 and/or embodied in firmware or dedicated hardware. Further, although the example program(s) is described with reference to the flowchart illustrated in FIGS. 8-9, many other methods of implementing the example re-timer 604 may alternatively be used. For example, the order of execution of the blocks may be changed, and/or some of the blocks described may be changed, eliminated, or combined.

As mentioned above, the example processes of FIGS. 8-9 may be implemented using coded instructions (e.g., computer and/or machine readable instructions) stored on a tangible computer readable storage medium such as a flash memory, a read-only memory (ROM), a cache, a random-access memory (RAM) and/or any other storage device in which information is stored for any duration (e.g., for extended time periods, permanently, for brief instances, for temporarily buffering, and/or for caching of the information). As used herein, the term tangible computer readable storage medium is expressly defined to include any type of computer readable storage device and to exclude propagating signals and to exclude transmission media. As used herein, "tangible computer readable storage medium" and "tangible machine readable storage medium" are used interchangeably. Additionally or alternatively, the example processes of FIGS. 8-9 may be implemented using coded instructions (e.g., computer and/or machine readable instructions) stored on a non-transitory computer and/or machine readable medium such as a flash memory, a read-only memory, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and to exclude propagating signals and to exclude transmission media. As used herein, when the phrase "at least" is used as the transition term in a preamble of a claim, it is open-ended in the same manner as the term "comprising" is open ended.

FIG. 8 is a flowchart illustrating an example process in which the example re-timer 604 performs auto-negotiation with one of the connected devices 602A, 602B. While the process of FIG. 8 may be performed with either of the example connected devices 602A, 602B, the flowchart is described with respect to a single connected device (e.g., the example computing device B 602B).

The process of FIG. 8 begins when the example first auto-negotiation handler 706 receives an auto-negotiation frame from the example computing device 602B via the example receiver 702 (block 802). The example first auto-negotiation handler 706 communicates with the example computing device 602B via the example first receiver 702 and the example second transmitter 720 to perform an auto-negotiation process to learn the capabilities of the example computing device 602B (block 804). For example, the example first auto-negotiation handler 706 may initiate an auto-negotiation process to learn the capabilities of the example computing device 602B and may terminate the auto-negotiation process without completing the auto-negotiation (e.g., by neglecting to send an acknowledgement (ACK) message in response to an auto-negotiation message from the example computing device 602B). The example auto-negotiation handler 706 exchanges determined capability information with the second auto-negotiation handler 708 (e.g., which is performing the process of FIG. 8 with the example computing device A 602A) (block 806). By exchanging the capability information among the example auto-negotiation handlers 706, 708, capability information that applies to both sides of the example re-timer 604 can be communicated among the example computing devices 602A, 602B.

The example first auto-negotiation handler 706 determines the capabilities that will be utilized on the communication link with the example computing device B 602B (block 808). For example, the example auto-negotiation handler 706 selects a highest common data rate from the capabilities of the example computing device A 602A, the example computing device B 602B, and the example re-timer 604. Alternatively, utilizing the transceivers and procedures described in conjunction with FIGS. 1-5, the connection data rate with one of the computing devices 602A, 602B may be different than the connection data rate utilized with the other one of the computing devices 602A, 602B. In addition to selecting shared capabilities, the example first auto-negotiation handler 706 selects capabilities that may be different for the re-timer 604 communicating with the example computing device B 602B than with the re-timer 604 communicating with the example computing device A 602A (e.g., FEC may be utilized in communicating with the computing device A 602A and FEC may not be enabled for communicating with the computing device B 602B).

The example first auto-negotiation handler 706 instructs the FEC handler 710, the example FEC handler 716, and/or the example computing device B 602B with the negotiated capabilities (block 810). For example, the first auto-negotiation handler 706 may transmit a notification to the example first FEC handler 710 and the example second FEC handler 716 indicating that FEC will not be enabled and may transmit an auto-negotiation frame to the example computing device B 602B indicating that FEC will not be enabled and further indicating a data rate to utilize (e.g., 10 Gbps). For example, the auto-negotiation handler 706 may initiate a second auto-negotiation process (e.g., after the auto-negotiation process initiated at block 804 was terminated) and may report the selected capability(ies) as the only capability(ies) of the example re-timer 604 (e.g., forcing the example computing device 602B to utilize the capability(ies) selected by the example re-timer 604.

FIG. 9 is a flowchart illustrating an example process that may be performed by the example re-timer 604 after the auto-negotiation process of FIG. 8 has been completed. While the process of FIG. * may be performed with either of the example connected devices 602A, 602B, the flowchart is described with respect to a single connected device (e.g., the example computing device B 602B).

The example process of FIG. 9 begins when the example first receiver 702 receives a data frame from the example computing device B 602B (block 902). The example first FEC handler 710 has previously been instructed by the auto-negotiation handler 706 about whether to use FEC and what type of FEC to utilize. Accordingly, the example first FEC handler 710 and the example second FEC handler 712 perform the instructed FEC handling (e.g., FEC bypass, FEC decoding Clause 74, FEC decoding Clause 91, FEC encoding Clause 74, FEC encoding Clause 91, etc.) (block 904). The example transmitter 718 performs re-timing of the example data frame (block 906). For example, the example transmitter 718 may recover a clock from the data and re-time that data for re-transmission. Alternatively, the re-timing may be performed by another component of the example re-timer 604 (e.g., the example first receiver 702, the example first FEC handler 710, the example second FEC handler 712, etc.). The example first transmitter 718 then transmits the data frame to a connected device (e.g., the second computing device A 602A) (block 908). The process of FIG. 9 then terminates.

Figure 10:
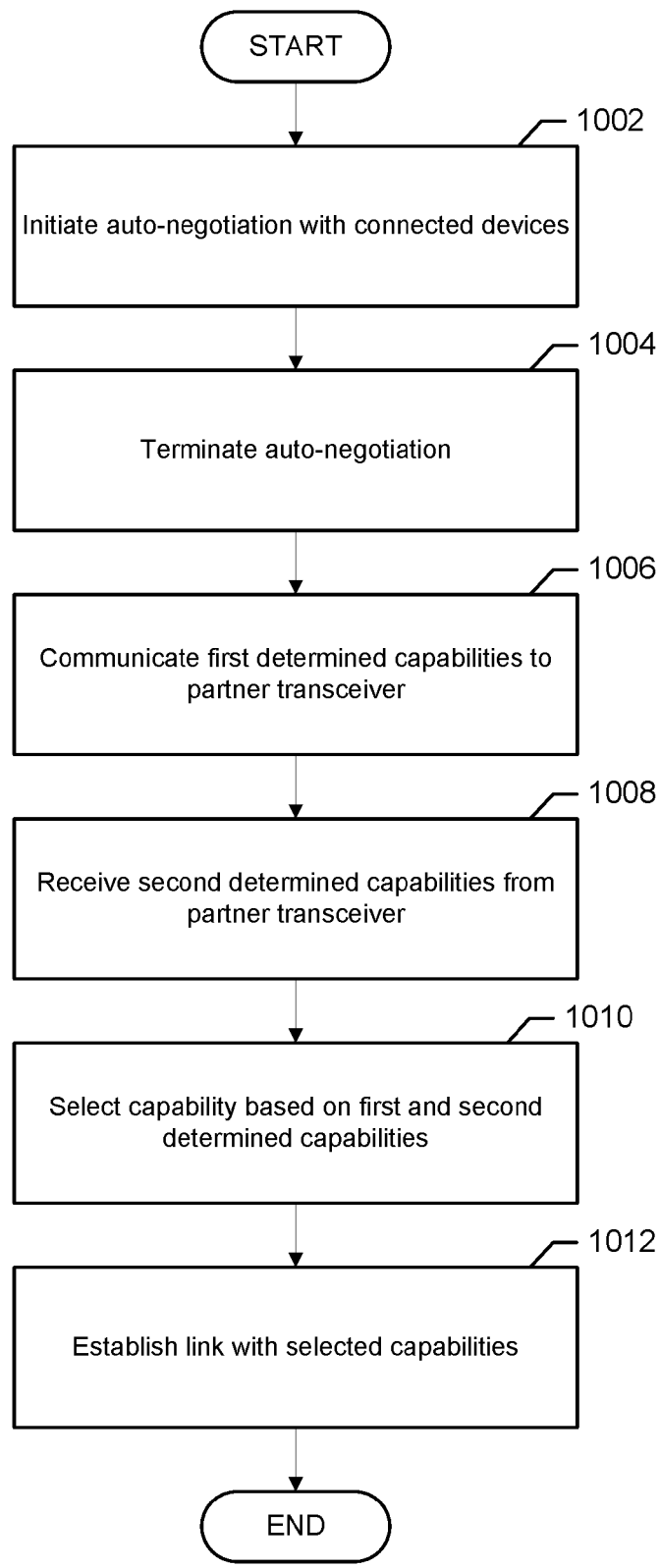
FIG. 10 depicts a flowchart of an example process that may be used to implement the example transceivers of FIGS. 1-2 and/or the example re-timer of FIGS. 6-7.

A flowchart representative of example machine readable instructions for implementing the example transceivers 104A, 104B of FIG. 1 and/or the example re-timer 604 of FIG. 6 is shown in FIG. 10. In this example, the machine readable instructions comprise program(s) for execution by a processor such as the processor 1112 or 1212 shown in the example processor platform 1100 or 1200 discussed below in connection with FIG. 11 or 12. The program(s) may be embodied in software stored on a tangible computer readable storage medium such as a memory associated with the processor 1112 or 1212, but the entire program(s) and/or parts thereof could alternatively be executed by a device other than the processor 1112 or 1212 and/or embodied in firmware or dedicated hardware. Further, although the example program(s) is described with reference to the flowchart illustrated in FIG. 10, many other methods of implementing the example transceivers 104A, 1046 of FIG. 1 and/or the example re-timer 604 of FIG. 6 may alternatively be used. For example, the order of executon of the blocks may be changed, and/or some of the blocks described may be changed, eliminated, or combined.

As mentioned above, the example processes of FIG. 10 may be implemented using coded instructions (e.g., computer and/or machine readable instructions) stored on a tangible computer readable storage medium such a flash memory, a read-only memory (ROM), a cache, a random-access memory (RAM) and/or any other storage device in which information is stored for any duration (e.g., for extended time periods, permanently, for brief instances, for temporarily buffering, and/or for caching of the information). As used herein, the term tangible computer readable storage medium is expressly defined to include any type of computer readable storage device and to exclude propagating signals and to exclude transmission media. As used herein, "tangible computer readable storage medium" and "tangible machine readable storage medium" are used interchangeably. Additionally or alternatively, the example processes of FIG. 10 may be implemented using coded instructions (e.g., computer and/or machine readable instructions) stored on a non-transitory computer and/or machine readable medium such as a flash memory, a read-only memory, a cache, a random-access memory and/or any other storage device in which information is stored for any duration (e.g., for extended time periods, permanently, for brief instances, for temporarily buffering, and/or for caching of the information). As used herein, the term non-transitory computer readable medium is expressly defined to include any type of computer readable storage device and to exclude propagating signals and to exclude transmission media. As used herein, when the phrase "at least" is used as the transition term in a preamble of a claim, it is open-ended in the same manner as the term "comprising" is open ended.

FIG. 10 is a flowchart illustrating an example process for a device that connects to two or more computing devices to perform auto-negotiation with each computing device and select different capabilities for use with each computing device. For example, the process of FIG. 10 may be implemented by the example transceivers 104A, 104B of FIG. 1 to facilitate the example transceiver A 104A utilizing a first set of capabilities in communicating with the example server C 102C and the example transceiver B 104B utilizing a second set of capabilities, different in at least some ways from the first set of capabilities, for communication with the example port 108 of the example switch 106. Similarly, the example re-timer 604 may utilize the example process illustrated by FIG. 10 to utilize a first set of capabilities in communicating with the example computing device A 602A and to utilize a second set of capabilities, different in at least some ways from the first set of capabilities, for communication with the computing device B 602B.

The goal of auto-negotiation is to negotiate a common operating mode for communicating Ethernet devices. Auto-negotiation consists of each device on the network sending and receiving capability pages. Both devices exchange an initial page (the Base Page) followed by optional pages with additional capabilities (Next Pages). Pages are exchanged one at a time, Base/Base, Next Page 1/Next Page 1, etc. Thus, for a first device to determine a second device's capabilities, the first device negotiates by sending an auto-negotiation page at a time until the second device has delivered all of its pages and informs the first device that it has no more. Once the second device has sent all of its pages (Base plus Next pages) it will continue to send Null Next pages as defined by the IEEE 802.3 spec until the first device (e.g., the electrical partner of the second device) has been given the opportunity deliver a set of auto-negotiation pages. To facilitate the example transceivers 104A, 104B, the example re-timer 604, and/or any other device that may be installed intermediate two communicatively coupled computing devices participating in the auto-negotiation process (e.g., not simply passing through auto-negotiation frames), the process of FIG. 10 facilitates such intermediate devices participating in the auto-negotiation process. By participating in the auto-negotiation process, the intermediate devices can ensure that communication capabilities supported by the intermediate devices are selected by the communicating devices.

The process of FIG. 10 begins when the example auto-negotiation controller 208 of the example transceiver A 104A initiates auto-negotiation with a connected device (e.g., the example server C 102C) (block 1002). The initiation of the auto-negotiation includes exchanging an auto-negotiation frame(s) with the connected device. The initial auto-negotiation informs the connected device of a base set of capabilities supported by the example transceiver A 104A and information the example auto-negotiation controller 208 of the base set of capabilities supported by the example connected device. The example auto-negotiation controller 208 then terminates the auto-negotiation with the connected device (block 1004). According to the illustrated example, the example auto-negotiation controller 208 terminates the auto-negotiation by not sending further auto-negotiation frames. Alternatively, the auto-negotiation controller 208 may transmit a notification that the auto-negotiation is to be terminated. According to the illustrated example, the auto-negotiation is terminated before the transceiver A 104A and the connected device have negotiated a set of capabilities to be utilized for data communication (e.g., a base set of supported capabilities has been shared by the devices but no capabilities from the base set of capabilities have been selected). For example, the auto-negotiation may be terminated by the auto-negotiation controller 208 neglecting to transmit an acknowledge (e.g., neglecting to set an acknowledgement bit in an auto-negotiation frame). Accordingly, when the connected device fails to receive the acknowledgement, the computing device will move to a TRANSMIT_DISABLE state in accordance with IEEE 802.3

The example auto-negotiation controller 208 then communicates the determined capabilities of the connected device to a partner transceiver via the example electrical/optical transceiver 204 and the example optical interface(s) 206 (e.g., the example transceiver B 104B) (block 1006). Alternatively, where the process of FIG. 10 is performed with the example re-timer 604, the example first auto-negotiation handler 706 transmits the capabilities to the example second auto-negotiation handler 708.

The example auto-negotiation controller 208 receives, via the example electrical/optical transceiver 204 and the example optical interface(s) 206, capabilities determined by the partner transceiver (block 1008). For example, the example transceiver B 104B may perform blocks 1002-1006 in communication with the example port 108 of the example switch 106 to determine capabilities of the example port 108 and/or the example switch 106.

The example auto-negotiation controller 208 then selects a set of capabilities based on the complete set of capabilities (e.g., the capabilities determined by the example auto-negotiation controller 208 for the device connected to the example transceiver A 104A and the capabilities determined from the example transceiver B 104B for the device connected to the example transceiver B 104B) (block 1010). For example, the auto-negotiation controller 208 may follow a predefined set of rules for selecting the capability to ensure that the partner device (e.g., the example transceiver B 104B will select the same set of capabilities from the determined sets of capabilities (e.g., some capabilities such as forward error correction code may be selected to be the same while other capabilities such as connection data rate may be selected to be different at each transceiver 104A, 104B). For example, the set of rules may specify a set of hierarchies to enable selection of the a most desirable set of capabilities from among the capabilities supported by all devices and/or by a subset of the devices (e.g., where some capabilities are used in one connection link with a first device but not used in another communication link with a second device). The example auto-negotiation controller 208 then causes a communication link to be established between the example transceiver A 104A and the connected device (e.g., the example server C 102C) utilizing the selected set of capabilities (block 1012).

While FIG. 10 is described with reference to the example transceivers 104A, 104B of FIGS. 1 and 2, the auto-negotiation process of FIG. 10 may be performed by the example first auto-negotiation handler 706 and the example second auto-negotiation handler 708 of FIG. 7.

Figure 11:
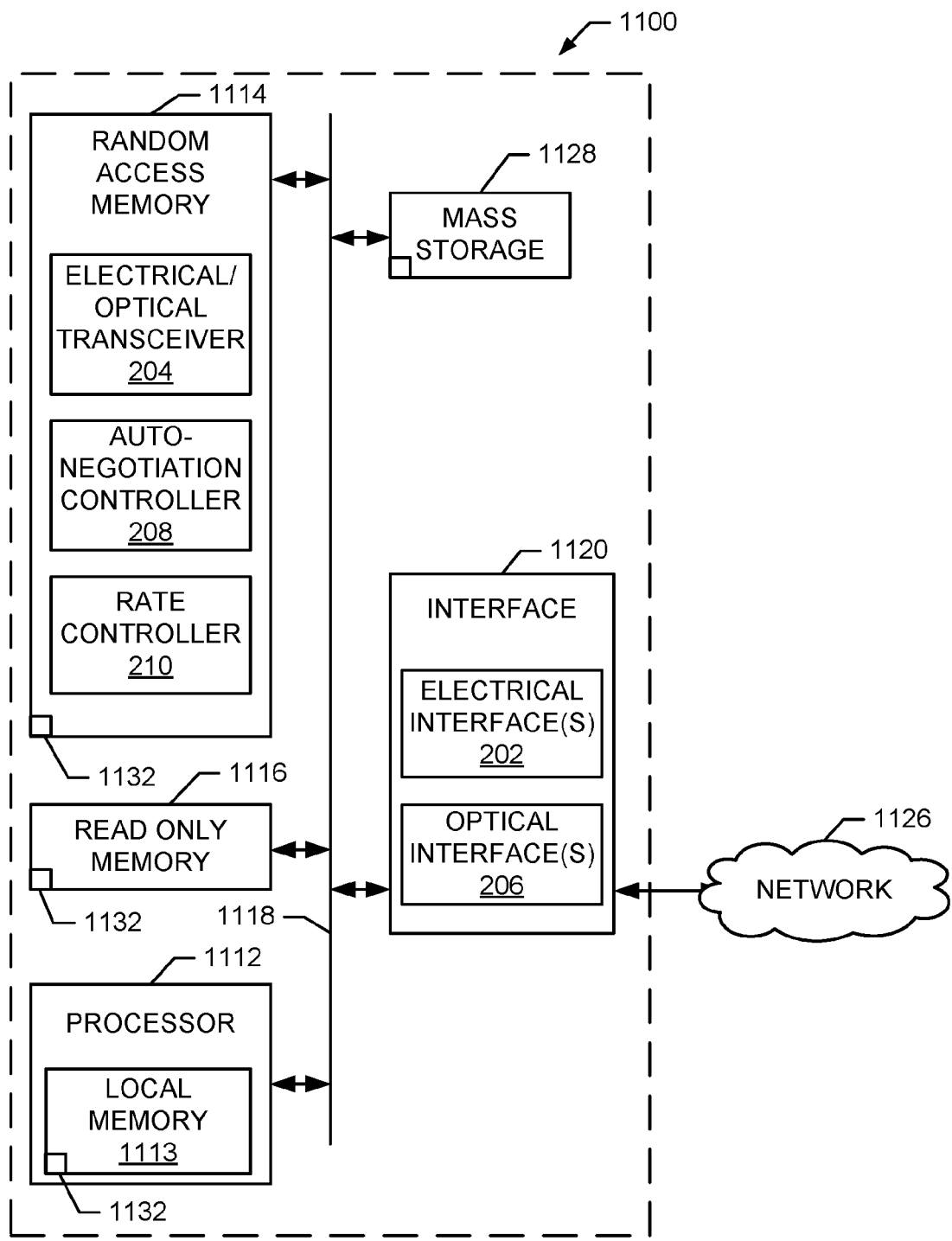
FIG. 11 is a block diagram of an example processor system that may be utilized to execute the machine readable instructions of FIGS. 3-5 and/or 10 to implement the example transceivers of FIGS. 1-2.

FIG. 11 is a block diagram of an example processor platform 1100 capable of executing the instructions of FIGS. 3-5 and/or 10 to implement the transceivers 104A, 104B of FIGS. 1-2. The processor platform 1100 can be, for example, an integrated microcontroller, an integrated circuit(s), a server, a personal computer, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller. The example processor 1112 executes instructions stored in the example random access memory 1114 to implement the example electrical/optical transceiver 204, the example auto-negotiation controller 208, and the example rate controller 210.

The processor platform 1100 of the illustrated example also includes an interface circuit 1120. The interface circuit 1120 may be implemented by any type of interface standard, such as an Ethernet interface, a universal serial bus (USB), and/or a PCI express interface. The example interface circuit 1120 includes the example electrical interface(s) 202 and the example optical interface(s) 206.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, etc.).

The processor platform 1100 of the illustrated example also includes one or more mass storage devices 1128 for storing software and/or data.

The coded instructions 1132 of FIGS. 3-5 and/or 10 may be stored in the mass storage device 1128, in the volatile memory 1114, in the non-volatile memory 1116, and/or on a removable tangible computer readable storage medium such as a flash memory.

Figure 12:
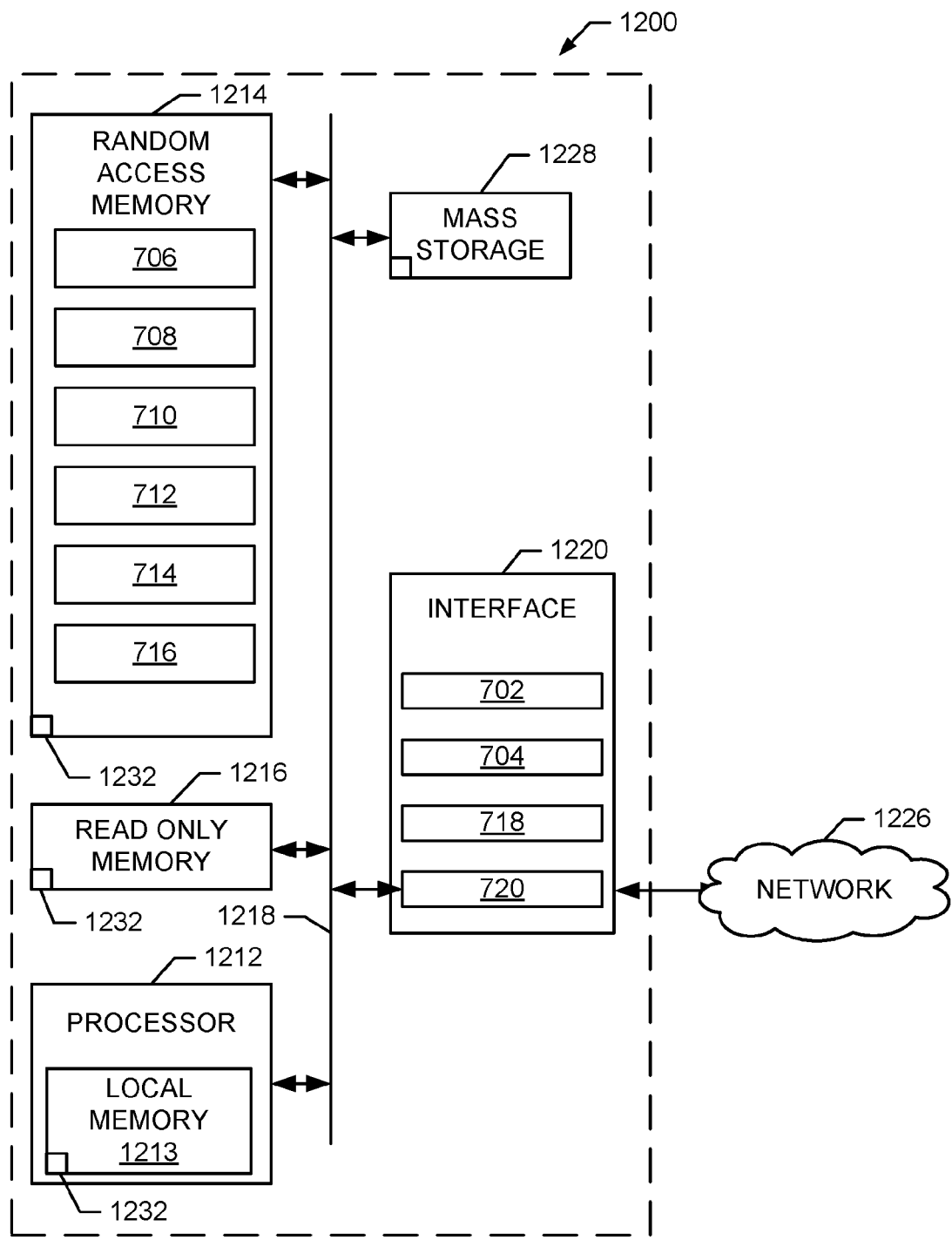
FIG. 12 is a block diagram of an example processor system that may be utilized to execute the machine readable instructions of FIGS. 8-9 and/or 10 to implement the example re-timer of FIGS. 6-7.

FIG. 12 is a block diagram of an example processor platform 1200 capable of executing the instructions of FIGS. 8-9 and/or 10 to implement the re-timer 604 of FIGS. 6-7. The processor platform 1200 can be, for example, an integrated microcontroller, an integrated circuit(s), a server, a personal computer, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller. The example processor 1212 executes instructions stored in the example random access memory 1214 to implement the example auto-negotiation handlers 706, 708 and the example FEC handlers 710-716.

The processor platform 1200 of the illustrated example also includes an interface circuit 1220. The interface circuit 1220 may be implemented by any type of interface standard, such as an Ethernet interface, a universal serial bus (USB), and/or a PCI express interface. The example interface circuit 1220 includes the example receivers 702, 704 and the example transmitters 718, 720.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example may also include one or more mass storage devices 1228 for storing software and/or data.

The coded instructions 1232 of FIGS. 3-5 and/or 10 may be stored in the mass storage device 1228, in the volatile memory 1214, in the non-volatile memory 1216, and/or on a removable tangible computer readable storage medium such as a flash memory.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A network re-timer comprising:
    a first receiver to receive data from a first connected device;
    a first forward error correction handler coupled to the first receiver;
    a second forward error correction handler coupled to the first forward error correction handler;
    a first auto-negotiation handler communicatively coupled to the first receiver and the first forward error correction handler to control the first forward error correction handler to decode the received data according a first forward error correction mode for communications with the first connected device based on a first auto-negotiation with the first device;
    a second auto-negotiation handler communicatively coupled to a first transmitter and the second forward error correction handler to control the second forward error correction handler to encode the decoded received data according a second forward error correction mode for communications with a second connected device based on a second auto-negotiation with the second connected device, wherein the first forward error correction mode is different than the second forward error correction mode; and
    the first transmitter to re-time the encoded data to generate re-timed data and to transmit the re-timed data to the second connected device.

2. The network re-timer as defined in claim 1, wherein the first forward error correction mode indicates that forward error correction will be utilized for communications with the first connected device and the second forward error correction mode indicates that forward error correction will not be utilized for communications with the second connected device.

3. The network re-timer as defined in claim 1, wherein the first forward error correction mode indicates that Clause 74 forward error correction will be utilized for communications with the first connected device and the second forward error correction mode indicates that Clause 91 forward error correction will be utilized for communications with the second connected device.

4. The network re-timer as defined in claim 1, wherein the second forward error correction handler is to bypass the re-timed data without performing forward error correction encoding when the second auto-negotiation handler instructs the second forward error correction handler that forward error correction is not to be utilized for communications with the second connected device.

5. The network re-timer as defined in claim 1, further including:
    a second receiver to receive second data from the second connected device and to re-time the second data to generate second re-timed data, the second auto-negotiation handler coupled to the second receiver; and
    a second transmitter to transmit the second data to the first connected device, the first auto-negotiation handler coupled to the second transmitter.

6. The network re-timer as defined in claim 5, further including:
    a third forward error correction handler coupled to the second receiver to decode the second re-timed data according to the second forward error correction mode; and
    a fourth forward error correction handler coupled to the second transmitter to encode the second re-timed data according to the first forward error correction mode.

7. The network re-timer as defined in claim 1, wherein the first auto-negotiation handler and the second auto-negotiation handler are communicatively coupled to share auto-negotiation information determined for the first connected device and the second connected device.

8. The network re-timer as defined in claim 1, wherein the first auto-negotiation handler is to perform a first auto-negotiation with the first connected device to determine support in the first connected device for forward error correction.

9. The network re-timer as defined in claim 8, wherein the second auto-negotiation handler is to:
    perform the second auto-negotiation with the second connected device to determine support in the second connected device for forward error correction; and
    transmit the support in the second connected device to the first auto-negotiation handler.

10. The network re-timer as defined in claim 1, wherein the first receiver utilizes the same communication rate as the first transmitter.

11. The network re-timer as defined in claim 10, wherein a first number of data lines coupling the network re-timer to the first communication device is equal to a second number of data lines coupling the network re-timer to the second communication device.

12. A non-transitory computer readable medium comprising instructions that, when executed, cause an Ethernet re-timer to at least:
    perform a first auto-negotiation with a first connected device to determine that the first connected device requests a first forward error correction mode;
    perform a second auto-negotiation with a second connected device to determine that the second connected device requests a second forward error correction mode, wherein the first forward error correction mode is different from the second forward error correction mode;
    re-time data received from the first connected device to generate re-timed data;
    decode the re-timed data based on the first forward error correction mode; and
    encode the decoded re-timed data based on the second forward error correction mode; and
    transmit the encoded re-timed data to the second connected device.

13. The non-transitory computer readable medium as defined in claim 12, wherein the first forward error correction mode indicates that forward error correction is not supported by the second connected device and the instructions, when executed, cause the Ethernet re-timer to encode the decoded re-timed data based on the second forward error correction mode by bypassing the decoded re-timed data for transmission without applying forward error correction.

14. A method comprising:
    performing a first auto-negotiation with a first connected device to determine that the first connected device requests a first forward error correction mode;

performing a second auto-negotiation with a second connected device to determine that the second connected device requests a second forward error correction mode, wherein the first forward error correction mode is different from the second forward error correction mode;

re-timing data received from the first connected device to generate re-timed data;

decoding the re-timed data based on the first forward error correction mode; and encoding the decoded re-timed data based on the second forward error correction mode; and transmitting the encoded re-timed data to the second connected device.

15. The method as defined in claim 14, wherein the first forward error correction mode indicates that forward error correction is not supported by the second connected device and encoding the decoded re-timed data based on the second forward error correction mode includes bypassing the decoded re-timed data for transmission without applying forward error correction.

\* \* \* \* \*